(12) United States Patent
Berstis

(10) Patent No.: US 6,708,311 B1
(45) Date of Patent: Mar. 16, 2004

(54) METHOD AND APPARATUS FOR CREATING A GLOSSARY OF TERMS

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,288

(22) Filed: Jun. 17, 1999

(51) Int. Cl.⁷ .............................................. G06F 17/21
(52) U.S. Cl. ...................................... 715/533; 715/532
(58) Field of Search ............................... 715/533, 530, 715/531, 532, 534

(56) References Cited

U.S. PATENT DOCUMENTS

| | | | |
|---|---|---|---|
| 5,007,019 A | 4/1991 | Squillante et al. | 364/900 |
| 5,056,021 A | 10/1991 | Ausborn | 364/419 |
| 5,210,853 A | 5/1993 | Nakasuji et al. | 395/425 |
| 5,404,507 A | 4/1995 | Bohm et al. | 395/600 |
| 5,469,355 A | 11/1995 | Tsuzuki | 364/419 |
| 5,551,049 A | 8/1996 | Kaplan et al. | 395/800 |
| 5,649,221 A | 7/1997 | Crawford et al. | 395/794 |
| 5,737,617 A * | 4/1998 | Bernth et al. | 704/1 |

OTHER PUBLICATIONS

Stone, M. "Ask Our Advisors: Word Processing." PC Magazine vol. 17, No. 16, pp. 260, Sep. 1998.*

* cited by examiner

Primary Examiner—Stephen S. Hong
(74) Attorney, Agent, or Firm—Duke W. Yee; Jeffrey S. LaBaw; Stephen J. Walder, Jr.

(57) ABSTRACT

A method, apparatus, and instructions for processing a datastream in a data processing system is provided. A datastream is automatically scanned and unidentifiable words are detected. The automatic scanning may be initiated in response to a spell checking operation on the datastream. A user provides an indication that an unidentified term is a correctly spelled new term, and the user provides a definition of the new term. A glossary of terms is automatically constructed for the document comprising the new term and the definition of the new term.

30 Claims, 13 Drawing Sheets

METHOD AND APPARATUS FOR CREATING A GLOSSARY OF TERMS

CROSS-REFERENCE TO RELATED APPLICATIONS

The present invention is related to now abandoned application entitled "METHOD AND APPARATUS FOR ACRONYM CHECKER AND AUTODEFINER", Ser. No. 09/306,192, filed May 6, 1999, assigned to the same assignee, and incorporated herein by reference.

BACKGROUND OF THE INVENTION

1. Technical Field

The present invention relates generally to an improved data processing system and, in particular, to a method and apparatus for processing documents and text streams.

2. Description of Related Art

Jargon is the bane of one's life in the modern world. Scientists and engineers are confronted with journals and papers that are filled with technical jargon. Government agencies produce voluminous reports with special terms and acronyms.

Many of these documents are written by persons familiar with technology but are not necessarily written by technical writers. Therefore, these documents are not written in a manner sympathetic to one who is unfamiliar with the subject matter. The documents tend to have many undefined terms that may include cryptic and undefined terms and acronyms. It may be difficult or impossible to read and comprehend a document with undefined terms.

The problem of simplifying technical papers grows steadily worse as technology marches onward. Although many corporations have attempted to incorporate open standards into their products, which results in some terms for proprietary technology becoming obsolete and unused, the number of special terms continues to increase rather than decrease. Technological growth spurs more technological innovation that requires special words to be coined for new concepts. As a result, more special terms or words are created. Almost no one is immune from this problem. With the explosive growth of the World Wide Web, persons searching the Web are likely to view documents and Web pages containing subject matter and terms with which one is unfamiliar.

Therefore, it would be advantageous to have a method and apparatus for rendering documents more readable. It would be further advantageous if the method and apparatus provided a user with some manner of understanding unfamiliar terms.

SUMMARY OF THE INVENTION

The present invention provides a method, apparatus, and instructions for processing a datastream in a data processing system. A datastream is automatically scanned and unidentifiable words are detected. The automatic scanning may be initiated in response to a spell checking operation on the datastream. A user provides an indication that an unidentified term is a correctly spelled new term, and the user provides a definition of the new term. A glossary of terms is automatically constructed for the document comprising the new term and the definition of the new term.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
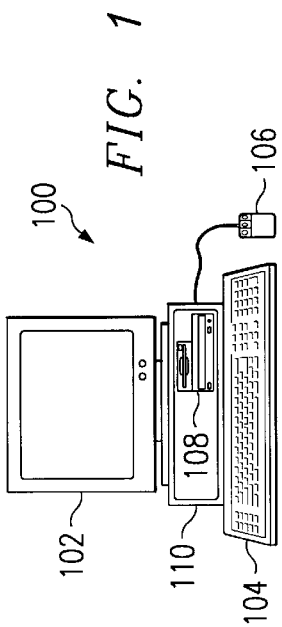
FIG. 1 is a pictorial representation depicting a data processing system in which the present invention may be implemented.

With reference now to FIG. 1, a pictorial representation depicts a data processing system in which the present invention may be implemented in accordance with a preferred embodiment of the present invention. A personal computer 100 is depicted which includes a system unit 110, a video display terminal 102, a keyboard 104, storage devices 108, which may include floppy drives and other types of permanent and removable storage media, and mouse 106. Additional input devices may be included with personal computer 100.

Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web-based television set top boxes, Internet appliances, palm computers, automobile systems, etc. Computer 100 also preferably includes a graphical user interface that may be implemented by means of systems software residing in computer readable media in operation within computer 100.

Figure 2:
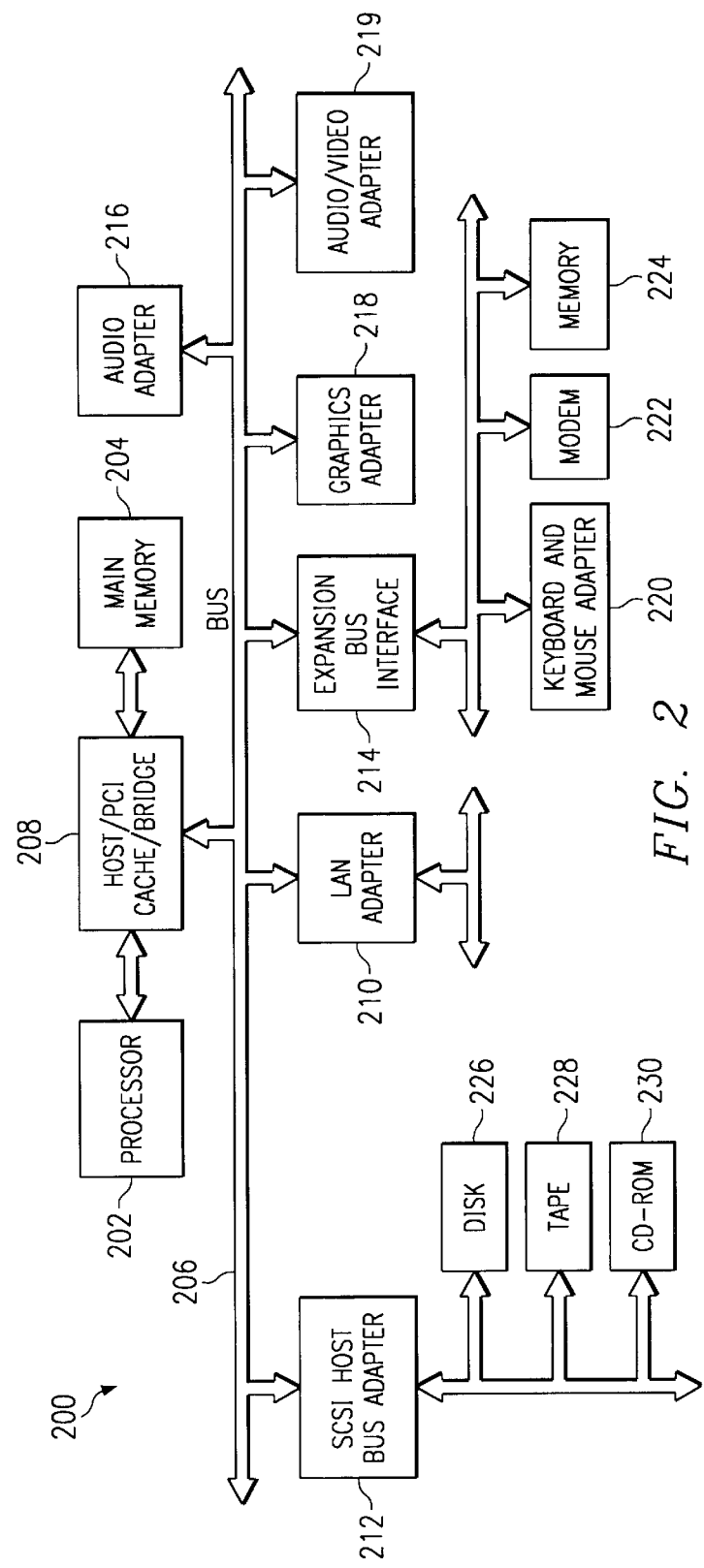
FIG. 2 is a block diagram illustrating internal components of a data processing system that may implement the present invention.

With reference now to FIG. 2, a block diagram illustrates internal components of a data processing system that may implement the present invention. Data processing system 200 is an example of a personal computer, such as computer 100 in FIG. 1. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to, or in place of, the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, even though data processing system 200 may contain some type of network communication interface. As a further example, data processing system 200 may be a Personal Digital Assistant (PDA) device which is configured with ROM and/or flash ROM in order to provide nonvolatile memory for storing operating system files and/or user-generated data.

Other examples for data processing system 200 include an Internet information appliance for surfing the Internet and the World Wide Web. Internet information appliances may include Web-based interactive television set-top boxes. The depicted example in FIG. 2 and above-described examples are not meant to imply architectural limitations.

An internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

Currently, the most commonly employed method of transferring data over the Internet is to employ the World Wide Web environment, also called simply "the Web". Most corporations and institutions now use the Web to publish publicly available documents. In the Web environment, servers and clients effect data transaction using the Hypertext Transfer Protocol (HTTP), a known protocol for handling the transfer of various datastreams and file formats (e.g., text, still graphic images, audio, motion video, etc.). Information is formatted for presentation to a user by standard markup languages, such as Hypertext Markup Language (HTML) and eXtensible Markup Language (XML). In addition to basic presentation formatting, HTML allows developers to specify "links" to other Web resources, usually identified by a Uniform Resource Locator (URL). A URL is a special syntax identifier defining a communications path to specific information. Each logical block of information accessible to a client, called a "page" or a "Web page", is identified by a URL.

The URL provides a universal, consistent method for finding and accessing this information, not necessarily for the user, but mostly for the user's Web "browser". A browser is a software application for requesting and receiving content from the Internet or World Wide Web. Usually, a browser at a client machine, such as data processing system 200, submits a request for information identified by a URL.

Retrieval of information or documents on the Web is generally accomplished with an HTML-compatible browser. Browsers are extensible through the use of plug-ins, which are small applications or applets that execute within the browser environment. Plug-ins provide a user with flexibility in configuring a browser with the specific functionality desired by a user. Plug-ins may be designed to filter or process datastreams according to options specified by a user. More information about browsers and the World Wide Web can be found at the Web site of the World Wide Web Consortium at http://www.w3.org.

Figure 3A:
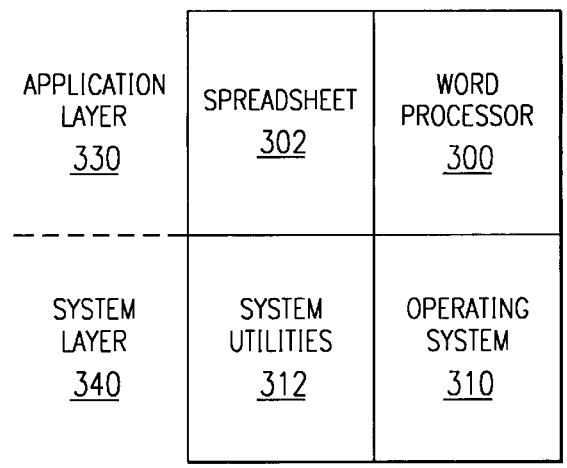
FIGS. 3A–3C are diagrams depicting the logical relationships between some of the software components within a data processing system that implements the present invention.
Figure 3B:
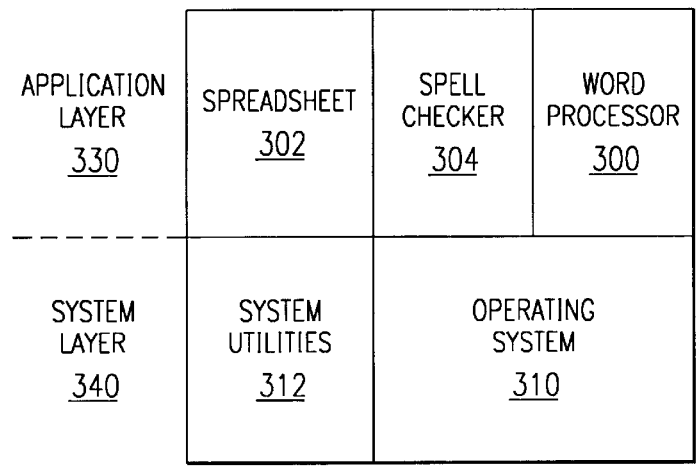
Figure 3C:
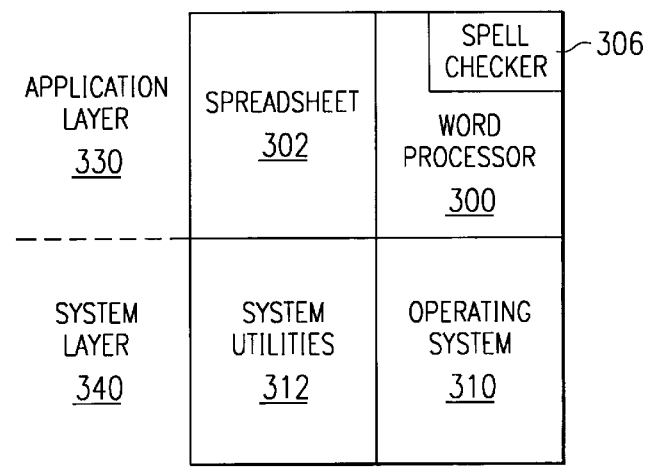

With reference now to FIGS. 3A–3C, diagrams depict the logical relationships between some of the software components within a data processing system that implement the present invention. In the figures, common reference numerals refer to similar or common components shown within the figures. The software components are logically divided into two layers: system layer 340 and application layer 330. System layer 340 contains operating system 310 and system utilities 312, such as drivers and other utilities that may execute in support of the operating system 310. Application layer 330 contains applications and programs that execute with the support of software within system layer 340.

FIG. 3A shows word processor 300 and spreadsheet 302 as applications executing in application layer 330. Applications within application layer 330 may share datastreams in manners that are well known in the art. Word processor 300 provides interactive editing functions to a user in conjunction with a graphical user interface supplied by operating system 310. Spreadsheet application 302 provides numerical manipulation functions on spreadsheet files stored with operating system 310.

FIG. 3B shows spell checker application 304 that may be invoked by either word processor application 300 or spreadsheet application 302. Spell checker application 304 provides functions for checking the spelling of words within files and datastreams manipulated by word processor 300 and spreadsheet application 302. In this configuration, spell checker 304 may be an application provided by a third party software provider specifically designed to understand file formats used by word processor 300 and spreadsheet application 302. Alternatively, spell checker 304 may be part of a suite of applications specifically designed to execute in an integrated manner.

FIG. 3C shows spell checker 306 embedded within word processor application 300. In this example, spell checker 306 provides functions for checking the spelling of words within word processor 300. However, spell checker 306 is not available to spreadsheet 302 as the functionality is embedded within a separate application.

FIGS. 3A–3C provide a set of examples for a software configuration on a data processing system that may include software functionality for checking the spelling of words. Although the spell checking functionality may be implemented in a variety of configurations, the spell checking functionality with respect to the processing of words in a datastream may be identical.

With reference now to FIGS. 4A–4D, block diagrams depict the logical relationships between software components on a data processing system that provide functionality for checking the spelling of words and for supporting the manipulation of acronyms or of a glossary of acronyms or special terms within datastreams. Common reference numerals between FIGS. 4A–4D represent common or identical software components throughout the figures. In a manner similar to that shown in FIGS. 3A–3C, FIGS. 4A–4D show the software components arranged in two logical categories: application layer 430 and system layer 440. Operating system 410 provides hardware support and application programming interfaces for the execution of applications within the application layer. System utilities 412 provide drivers and other support for operating system 410.

Figure 4A:
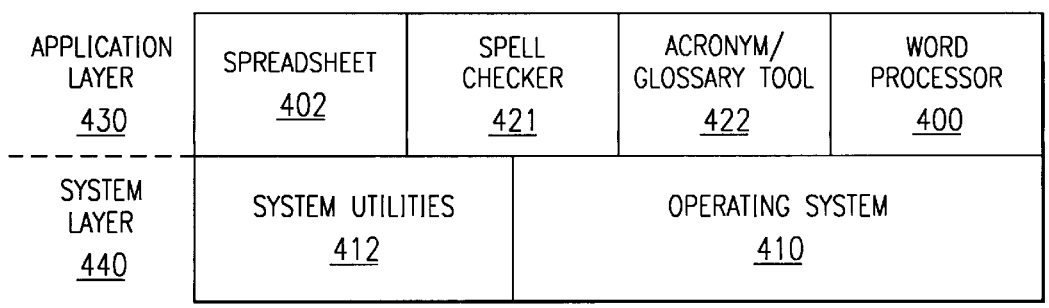
FIGS. 4A–4D are block diagrams depicting the logical relationships between software components on a data processing system that provide functionality for checking the spelling of words and for supporting the manipulation of acronyms or of a glossary of acronyms or special terms within datastreams.

FIG. 4A shows word processor 400 and spreadsheet application 402 executing within application layer 430. Spell checker 421 and acronym/glossary tool 422 may be invoked by other applications to perform specific functionality on datastreams for the other applications. Acronym/glossary tool 422 may be closely integrated with spell checker 421 so that acronym/glossary tool 422 and spell checker 421 may share functionality between the applications.

Figure 4B:
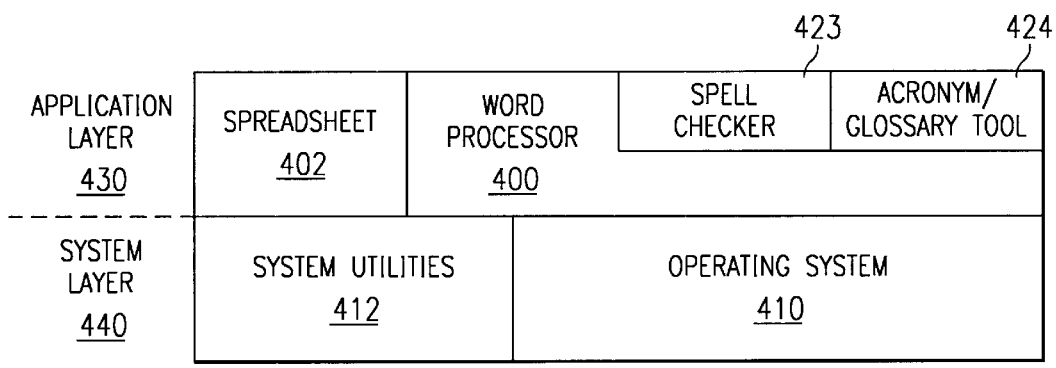

FIG. 4B shows word processor 400 and spreadsheet application 402 executing within the application layer. In this example, spell checker 423 and acronym/glossary tool 424 have been embedded within word processing 400 in such a manner that spell checker 423 and acronym/glossary tool 424 may not be invoked by spreadsheet application 402.

Spell checker 423 and acronym/glossary tool 424 provide processing on a datastream as directed by word processor 400. Acronym/glossary tool 424 and spell checker 423 may be closely integrated so that the two components share functionality.

Figure 4C:
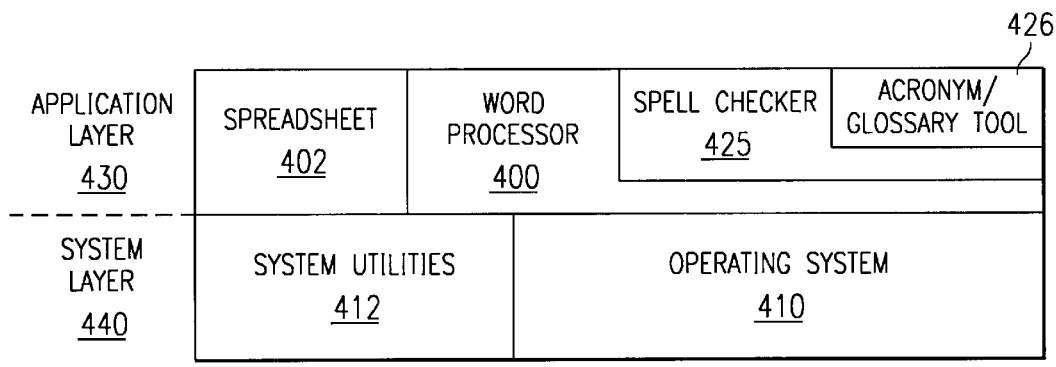

FIG. 4C shows word processor 400 and spreadsheet application 402 executing within the application layer. In this example, acronym/glossary tool 426 has been embedded within spell checker 425 which, in turn, has been embedded in word processor 400. Spell checker 425 provides functionality for checking the spelling of words within word processor 400 in a manner in which the spell checker's functionality may not be invoked by spreadsheet 402. Acronym/glossary tool 426 provides processing on a datastream in such a manner that the functionality provided by acronym/glossary tool 426 is not separately invokable without also using spell checker 425.

Figure 4D:
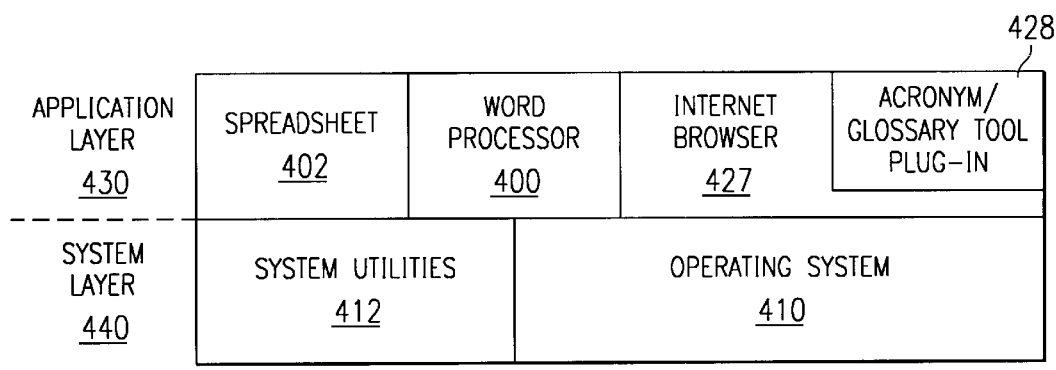

FIG. 4D shows Internet browser 427, word processor 400, and spreadsheet application 402 executing within the application layer. In this example, acronym/glossary tool 428 provides functionality for processing acronyms within a datastream by being configured as a plug-in that executes within Internet browser 427. FIGS. 4A–4D provide a set of examples in which an acronym/glossary tool may be configured in a variety of manners with other software components executing within a data processing system.

Figure 5:
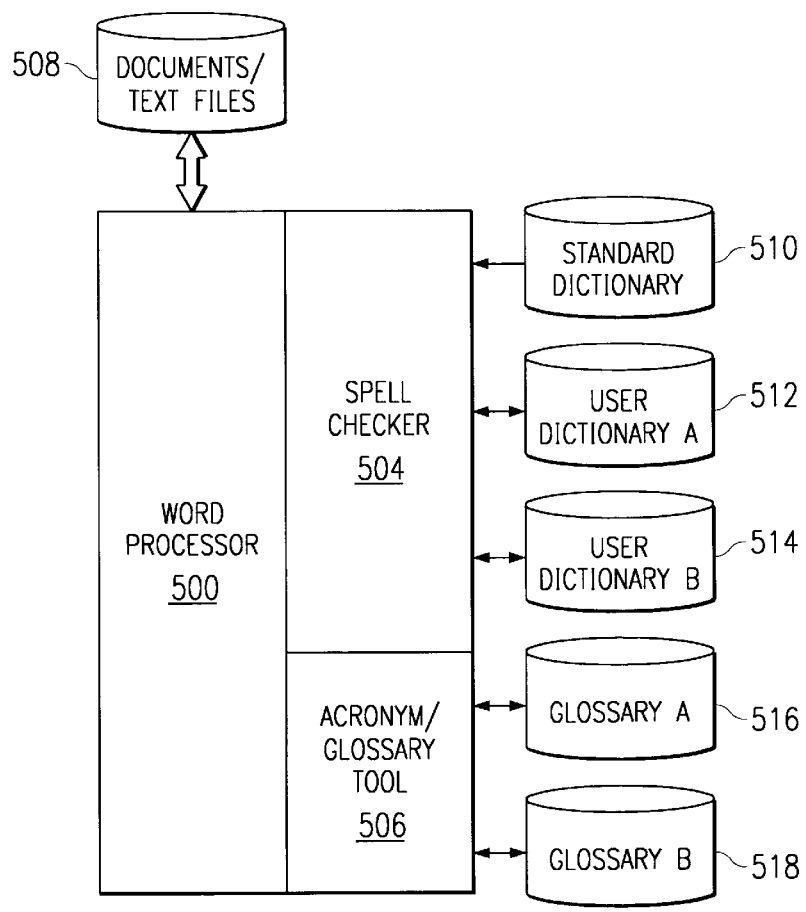
FIG. 5 is a diagram depicting an example for configuring an acronym/glossary tool among other software components in relation to the storage of data files and information that may be accessed by each of the software components.

With reference now to FIG. 5, a diagram depicts an example for configuring an acronym/glossary tool among other software components in relation to the storage of data files and information that may be accessed by each of the software components. Word processor 500 reads and writes documents and text files 508. Spell checker 504 may access a variety of databases against which words in a datastream may be compared. Word processor 500 may invoke spell checker 504 to check the spelling of words within a datastream generated by reading documents and text files 508.

Spell checker 504 reads Standard Dictionary 510, User Dictionary A 512, and User Dictionary B 514, which provide lists of properly spelled words. Spell checker 504 may also store user-specified spellings of words in User Dictionary A 512 and User Dictionary B 514. User Dictionary A 512 and User Dictionary B 514 are editable and customizable to user preferred spellings of words and standard spellings of words not stored in Standard Dictionary 510.

Acronym/glossary tool 506 is invoked by word processor 500 to perform processing on acronyms detected in datastreams generated by reading documents and text files 508. Acronym/glossary tool 506 may read and write Glossary A 516 and Glossary B 518. Acronym/glossary tool 506 uses these glossaries to provide lists of previously defined acronyms. A standard glossary could be provided to acronym/glossary tool 506 in a manner similar to the provision of Standard Dictionary 510.

Glossary A 516 and Glossary B 518 may be user-customizable and user-editable so that the content of the glossary may be tailored to the specific use required by a user of the data processing system. Acronym/glossary tool 506 may provide one glossary per document so that each glossary is tailored to the specific content of a single document.

Figure 6:
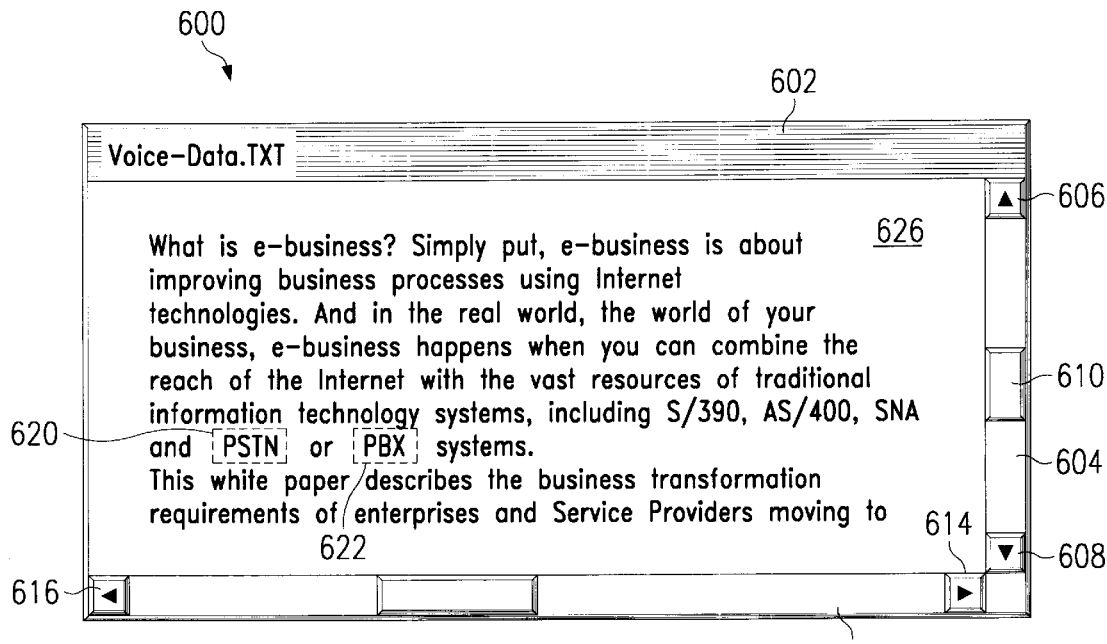
FIG. 6 is a diagram depicting a standard document window within a graphical user interface.

With reference now to FIG. 6, a diagram depicts a standard document window within a graphical user interface. Document window 600 contains title bar 602, scrollbars 604 and 612, and content area 626. Scroll bar 604 contains up arrow indicator 606, elevator 610 and down arrow 608 for scrolling the content area in a vertical direction in response to user manipulation of a pointing device such as a mouse. Scrollbar 612 contains left arrow 616 and right arrow 614 for scrolling the content area in a horizontal direction in response to user manipulation of a pointing device. Content area 626 has text that contains acronyms 620 and 622. An acronym is a word derived from the letters, a group of letters, or selected letters in a multi-word descriptive noun or other expression that often serves as a mnemonic. Acronyms may be used for corporate names, such as "IBM" for "International Business Machines". Other acronyms become common words in the vernacular, such as "PC" for "personal computer" and "RAM" for "Random Access Memory". In the example shown in content area 626, acronym 622 is "PBX", which stands for "Private Branch Exchange". Acronym 620 is "PSTN", which stands for "Public Switch Telephone Network".

A datastream is a byte-by-byte flow of data. Streams may be input and output from a variety of devices, including storing the stream as a file or sending the stream to a display device so that the content of the stream may be presented to the user in a manner similar to that shown in content area 626. As noted, a datastream may represent content retrieved from a file. However, a datastream may be derived from a variety of sources. For example, a datastream may be content retrieved according to a specific network protocol across a network or the Internet. A datastream may also be piped-output from a batch-processing program.

Figure 7:
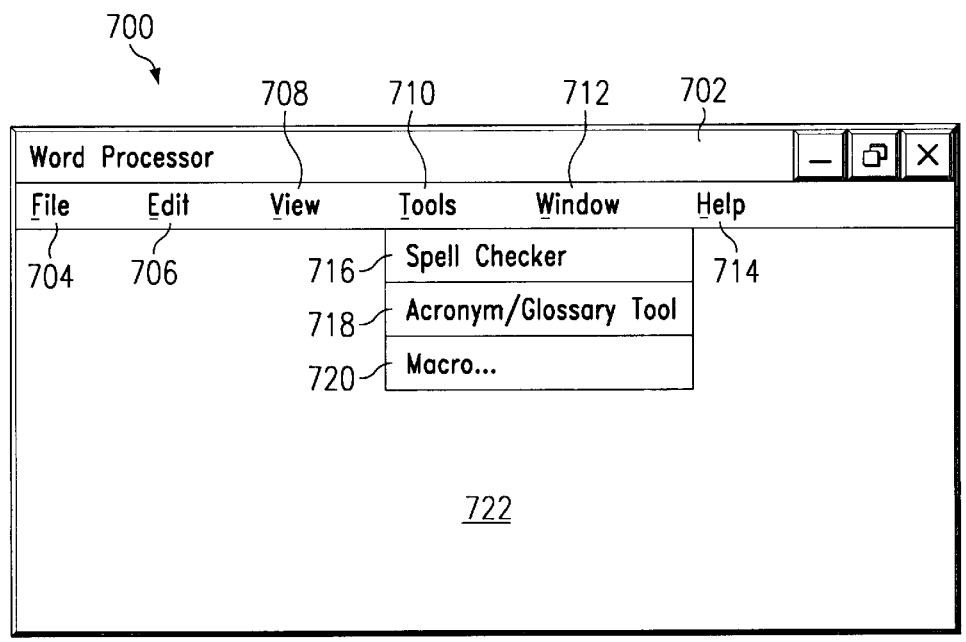
FIG. 7 is a pictorial representation of an application window depicting a manner in which an acronym/glossary tool may be invoked in another application.

With reference now to FIG. 7, a pictorial representation of an application window depicts a manner in which an acronym/glossary tool may be invoked in another application. Window 700 shows an application window for a word processor, which includes title bar 702, menus 704–714, and content area 722. File menu 704 contains menu items that provide file manipulation functions. Edit menu 706 contains menu items that provide editing functions. View menu 708 contains items that provide formatting functions for the content displayed in document windows. Tools menu 710 provides menu item access to various functions that may operate in conjunction with the word processor. Window menu 712 contains menu items that allow a user to manipulate various document windows within the word processor. Help menu 714 provides a user with access to help files.

Tools menu 710 contains "Spell Checker" menu items 716, "Acronym/Glossary Tool" menu item 718, and "Macro" menu item 720. Menus 716–720 may be selected in a manner that is well-known in the art for initiating the depicted function. In this example, a spell checker and an acronym/glossary tool are separately invokable functions similar to the configuration to the software components shown in FIG. 4B. For example, a user may invoke the acronym/glossary tool by selecting a word within a document and specifying a new definition for the word that is to be placed into the glossary. The user may provide a non-standard definition for a word such that the user coins a new use for the word. Other well-known manners of invoking various functions within an application may be provided in accordance with the operation of the present invention.

Figure 8:
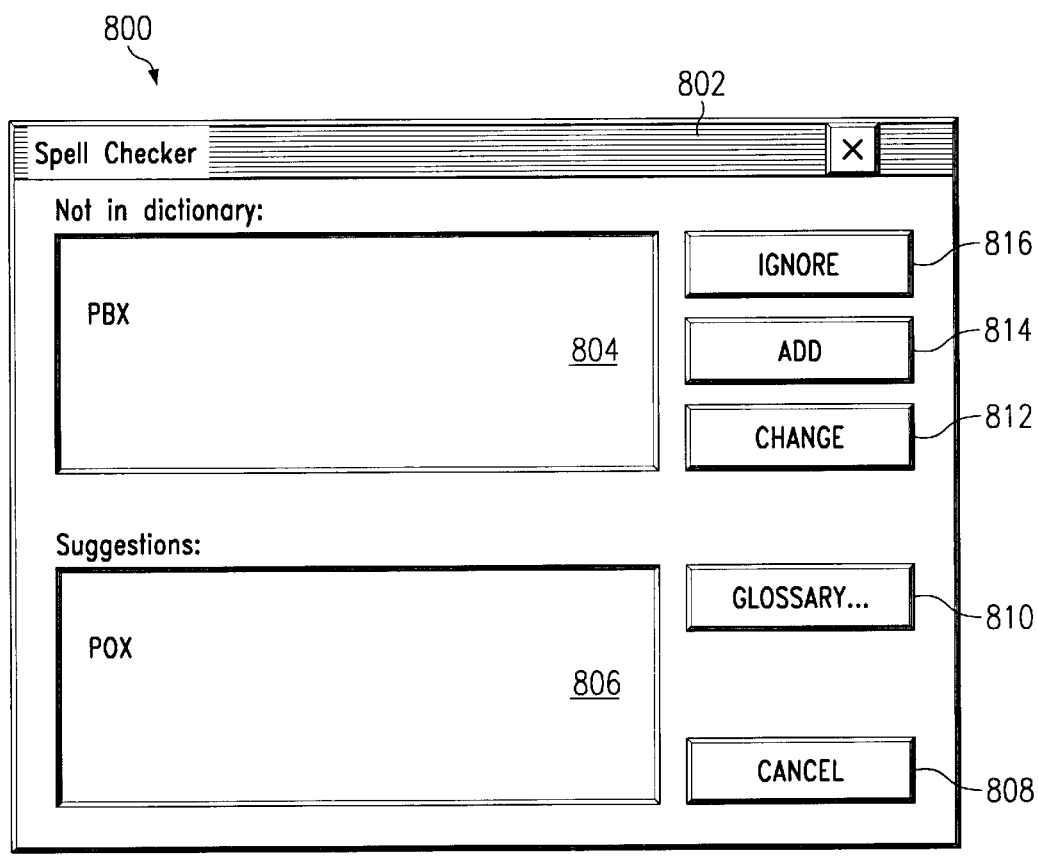
FIG. 8 is a pictorial representation depicting a dialog box for a spell checking function that may have been invoked in response to a user request.

With reference now to FIG. 8, a pictorial representation depicts a dialog box for a spell checking function that may have been invoked in response to a user request. Window 800 may be presented to a user in response to a user selection through a menu similar to that shown in FIG. 7. The spell checker tool has scanned the words present in a document window of a word processor in order to determine whether any of the words are misspelled. The spell checker tool identifies potentially misspelled words and suggests to the user properly spelled words. Words that have not been identified as correctly spelled words by the spell checking function are presented to the user within window area 804.

In this case, the word "PBX" has been located within the document window but has not been matched with any words in a dictionary accessed by the spell checker tool. Properly spelled words are suggested to a user in window area 806. In this example, the word "POX" has been suggested to the user as a replacement word for the unidentified word "PBX".

If the user believes that the word is properly spelled, the user may select IGNORE button 816. Selection of IGNORE button 816 informs the spell checker that the currently unidentified word should be ignored by the spell checker, and the spell checking function should continue scanning for misspelled words within the current document. If the user believes that the unidentified word is a correctly spelled word, the user may select ADD button 814 that informs the spell checker to add the unidentified word to one of the dictionary files as a correctly spelled word. Subsequent comparisons between the current word and the modified dictionary will result in a positive identification of the word so that it is not flagged as a misspelled word. If the user agrees that the unidentified word is a misspelled word and believes that the unidentified word should be replaced with the word suggested by the spell checker, then the user may select CHANGE button 812, which will replace the unidentified word with the suggested word.

If the user desires to identify the unidentified word as a new or special term or as an acronym, the user may select GLOSSARY button 810. Selection of GLOSSARY button 810 informs the spell checker that the user desires to classify the unidentified word as a newly defined term. In response, the spell checker will invoke the acronym/glossary tool to allow the user to enter information concerning the new term or acronym. If the user desires to stop the spell checker, then the user may select CANCEL button 808.

Figure 9:
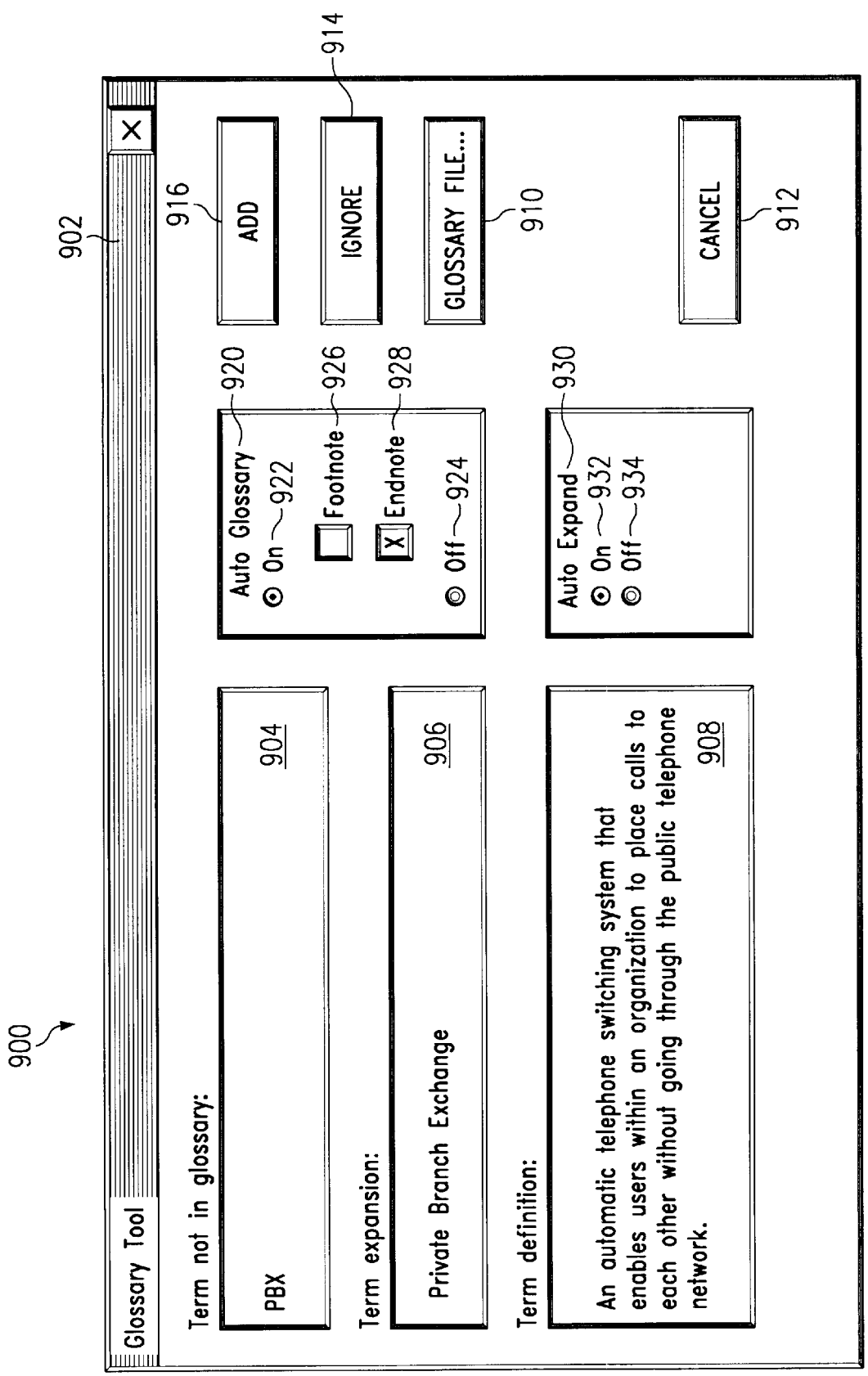
FIG. 9 is a pictorial representation of a dialog box depicting a manner for presenting an acronym/glossary tool within a data processing system.

With reference now to FIG. 9, a pictorial representation of a dialog box depicts a manner for presenting an acronym/glossary tool within a data processing system. Window 900 contains: window title bar 902; term box 904; expansion box 906; and definition box 908. Term box 904 presents a new term, a special word, or an acronym that the user has previously selected to be indexed into the glossary or that the tool had found to be unidentifiable. Expansion box 906 contains the expansion for the term presented within term box 904.

In this case, term box 904 contains the acronym "PBX" which was present as acronym 622 in FIG. 6 and flagged by the spell checker as an unidentified word within FIG. 8. However, the acronym/glossary tool may have been invoked as a separately executing tool, and the user may have entered a term or acronym into a dialog box without the term or acronym appearing in the content of the document or datastream. In this manner, the user may enter a term into the glossary in order to provide additional, contextual information in the glossary. When the glossary is displayed, those terms or acronyms that do not appear within the associated content may be so noted in the glossary entry or may be graphically marked to indicate that the term or acronym does not appear in the content.

The expansion of an acronym is an expression comprising the plurality of nouns or words from which the acronym is derived. Generally the expansion of an acronym is provided within a document immediately following the foremost occurrence of the acronym within the document. Once the reader of the document is informed of the meaning of an acronym, the shorthand form of the expression, i.e. the acronym, may subsequently be used throughout the document. In this example, the user has entered the words "Private Branch Exchange" into the expansion box as the explanatory expression for the acronym "PBX".

If the term in term box 904 is a newly introduced term or special term that is defined or explained within the document in which it appears, expansion box 906 may hold a small phrase, a short description, a mnemonic, etc., that may be placed in close proximity to the appearance of the term in the document or datastream in order to jog the reader's memory for the meaning of the term.

Definition box 908 provides the definition of the term. The definition may be stored with the term or acronym in a glossary. FILE button 910 allows the user to specify the glossary file into which the definition of the term should be stored. In this example, the user has entered the definition for a PBX, which is "an automatic telephone switching system that enables users within an organization to place calls to each other without going through the public telephone network." If the user makes a mistake while entering a definition of a term or simply desires to close the acronym/glossary tool without saving any information, the user may select CANCEL button 912.

If the user decides that the term identified by the spell checker should not be placed into a glossary and desires to continue processing or spell checking, the user may select IGNORE button 914. If the user desires to add the term and any associated information, such as its expansion and its definition, the user may select ADD button 916. Alternatively, another user selectable control may be provided so that ADD button 916 may add the term or acronym to the glossary file without adding the term or acronym to the presentation of the glossary that appears in conjunction with the content.

As another alternative, the user may be able to specify a term or acronym and provide its expansion so that the expansion appears in close proximity to the term or acronym while excluding the term or acronym from the glossary. This feature may be helpful for those terms or acronyms for which it is important to clarify the context of the term or acronym. Once the proper context for the term or acronym is provided through the use of an expansion, the author of the content may choose to exclude the term or acronym from the glossary as being relatively unnecessary. For example, "PC" may refer to "personal computer" or "politically correct," yet once the proper meaning is conveyed, the reader is unlikely to forget the intended meaning.

"Auto Glossary" control 920 provides the user with control over the automatic generation of a glossary within a current document. Radio buttons 922 and 924 allow the user to toggle the automatic glossary generation function on and off. Check boxes 926 and 928 allow the user to control the placement of the glossary within the current document.

If the user selects Footnote check box 926, the acronym/glossary tool automatically generates a short glossary as a footnote on each page in which the term appears. In this case, the glossary may contain only those terms in the glossary that have been defined for the current page being viewed by the user.

If the user selects Endnote check box 928, the acronym/glossary tool automatically generates a glossary that is placed as an endnote at the end of the current document. In this case, the glossary contains all of the terms in the glossary that have been defined for the current document or portion of a datastream that is being viewed by the user. The glossary may placed at an author-designated location within a document or datastream, as described in more detail further below.

Window 900 also contains "Auto Expand" control 930 for allowing the user to specify an option for the automatic expansion of a term within the current document. Radio buttons 932 and 934 allow the user to toggle the feature on and off. If the user selects this feature, the acronym/glossary tool will insert an expansion of a term automatically into the current document in close proximity to the foremost occurrence of the term in the document.

Figure 10:
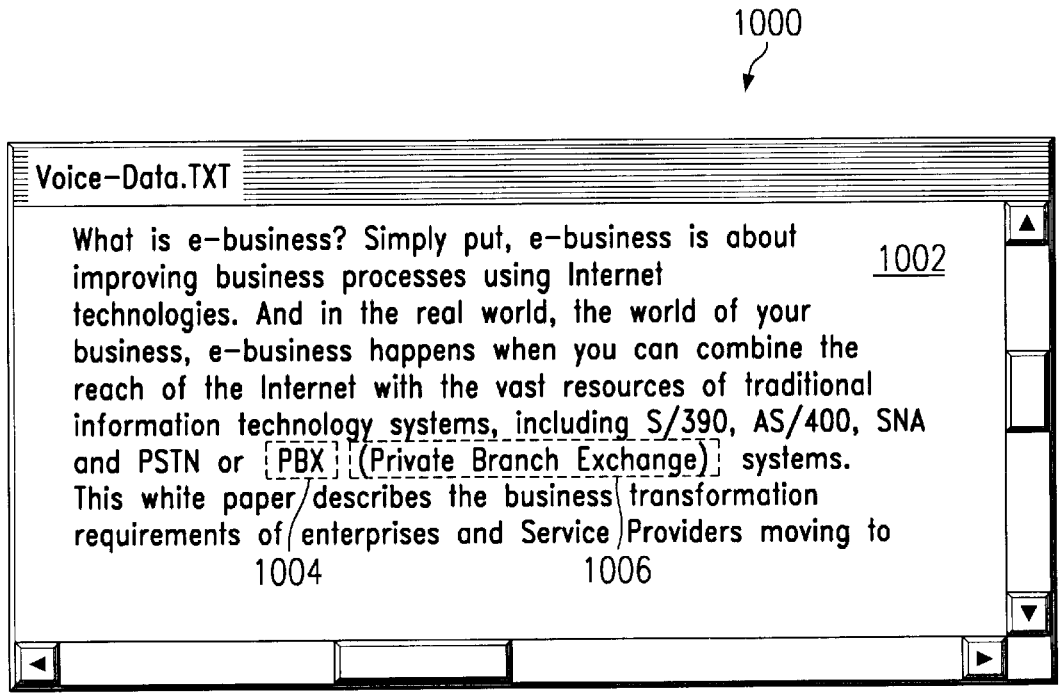
FIG. 10 is a pictorial document window depicting an acronym and its expansion within a datastream.

With reference now to FIG. 10, a pictorial document window depicts an acronym and its expansion within a datastream. FIG. 10 is similar to FIG. 6. Window 1000 contains content area 1002 that presents the content of a document to a user. The content area contains an acronym "PBX" and its expansion "Private Branch Exchange". Acronym 1004 is immediately followed by acronym expansion 1006. The expansion of acronym 1004 has been performed automatically by the acronym/glossary tool according to an option specified by a user within an acronym/glossary tool. In this example, the acronym/glossary tool has expanded acronym 1004 by immediately following it with its expansion because the occurrence of "PBX" in content area 1002 is the foremost occurrence of this acronym within the document of datastream. Alternatively, the expansion of an acronym may be placed in front of the acronym, and the alternative placement may be selectable as an option by the user.

Figure 11:
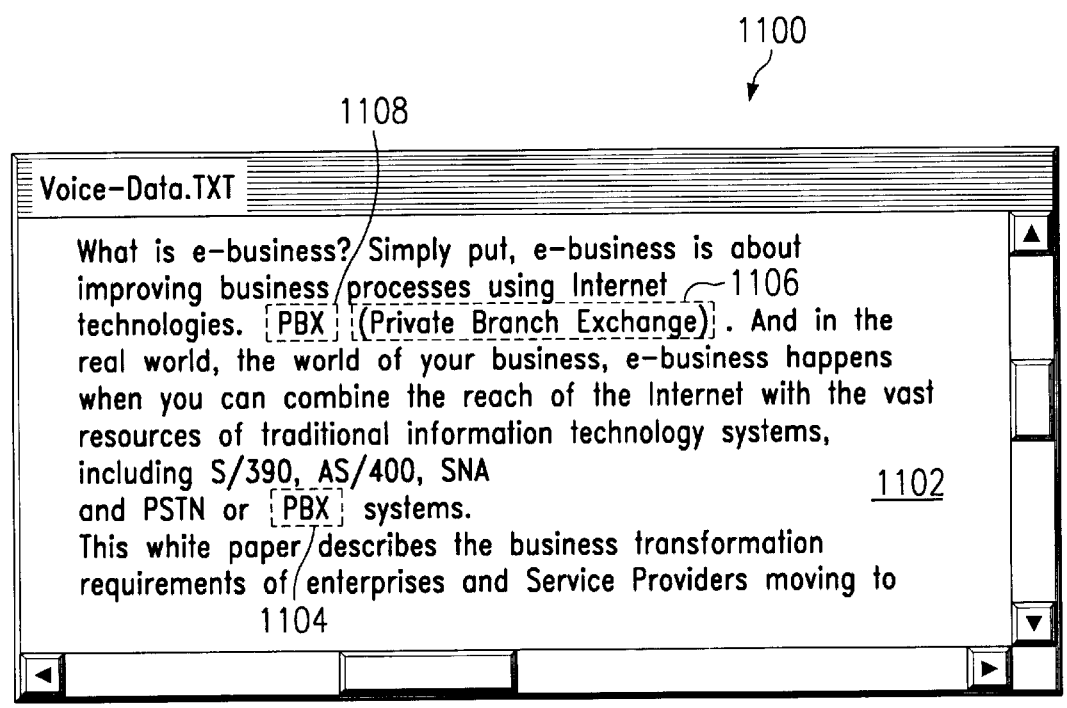
FIG. 11 is a pictorial representation depicting a document window in which a user has edited the location of an acronym.

With reference now to FIG. 11, a pictorial representation depicts a document window in which a user has edited the location of an acronym. Window 1100 is a document window that contains content area 1102. Content area 1102 contains acronym 1104, acronym 1108, and acronym expansion 1106. Acronyms 1104 and 1108 are the identical word "PBX". Acronym 1104 no longer has an acronym expansion immediately following it as shown in FIG. 10. Acronym 1104 is similar to acronym 1004 shown in FIG. 10. FIG. 11 depicts an example in which the user has edited the document or datastream by inserting an identical acronym into the datastream at a location prior to the placement of the originally foremost location of acronym "PBX". Because the user has previously selected an option within the acronym tool for automatically expanding acronyms, the acronym tool, in association with the word processor, has moved the expansion for acronym "PBX" so that the expansion is in close proximity to the foremost occurrence of the acronym within the document or datastream. In this manner, the user is provided with the expansion of an acronym at the proper location, i.e. the location at which the acronym is first introduced to the user within the datastream.

As shown in FIG. 11, the expansion of the acronym is placed as a parenthetical expression immediately following its acronym. However, alternative display formats could be provided, such as displaying the expansion of the acronym to the user as a so-called "tool tip" in which the acronym appears as a floating box in the immediate vicinity of the acronym. Many different examples could be provided to show the feature in which the expansion of the acronym is presented to the user with varying emphasis in close proximity to the acronym. For example, the position of the acronym expansion may be an option selectable by the user, such as immediately in front of the acronym or immediately following the acronym. If the acronym expansion is in front of the acronym, then the acronym may be set parenthetically within the text while the expansion is not. The delimiter to be used for offsetting the acronym or acronym expansion may be selectable by the user, such as parentheses, brackets, braces, hyphens, asterisks, etc. The display emphasis may also vary, such as italic, bold, underlying, color, shade, etc.

After the acronym is identified, the acronym or its expansion or both may be replaced by an acronym data object or an acronym expansion data object that can not be edited by the user. Once the text of the acronym or expansion is replaced by a data object, the data object may be moved or deleted, but its content cannot be changed. Alternatively, functionality may be provided that allows a user to switch from one acronym to another without editing the text of the acronym.

Figure 12:
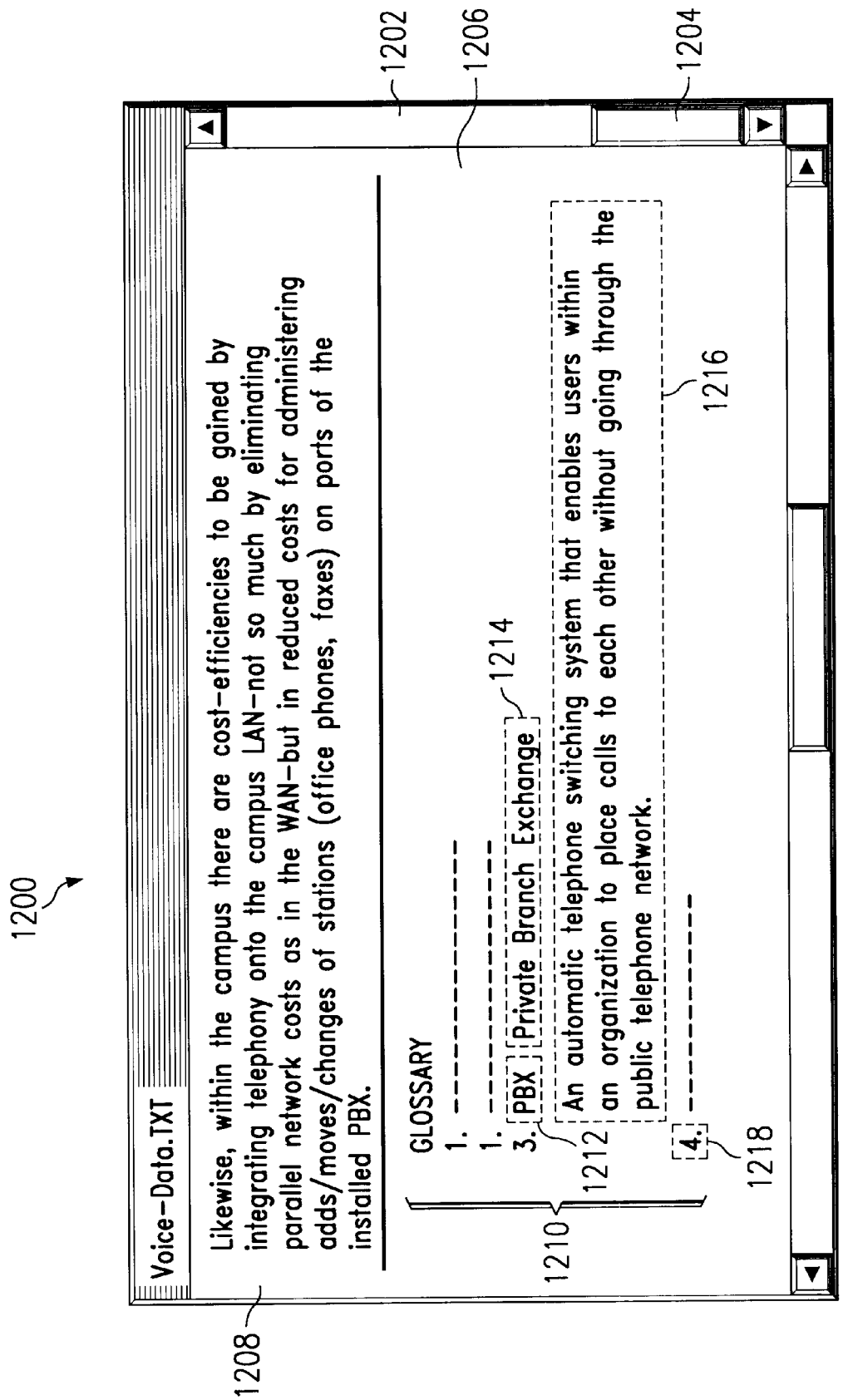
FIG. 12 is a pictorial representation of a document window depicting the automatic insertion of a glossary of terms as an endnote to the currently presented datastream.

With reference now to FIG. 12, a pictorial representation of a document window depicts the automatic insertion of a glossary of terms as an endnote to the currently presented datastream. Window 1200 has vertical scroll bar 1202 and content area 1206. Scroll bar 1202 contains elevator 1204 that indicates that document window 1200 is displaying the end of a document. Content area 1206 shows the end of the content of document as area 1208. Endnote 1210 contains a glossary showing information for terms present within the content of the document presented by window 1200. The placement of the glossary as an endnote was previously selected as an option by the user through input into the glossary tool.

Term 1212 is displayed immediately followed by its expansion 1214. The expansion of the term is then immediately followed with the definition of term 1212. Definition 1216 defines term 1212 with the content previously provided by user as input into the acronym/glossary tool. Graphical indication 1218 (in this case, a bolded and italicized reference numeral) shows that the indicated term is included within the glossary but does not appear within the content, as may occur if the user or the author of the content has merely included the indicated term within the glossary to provide more contextual information while reading the content.

Figure 13:
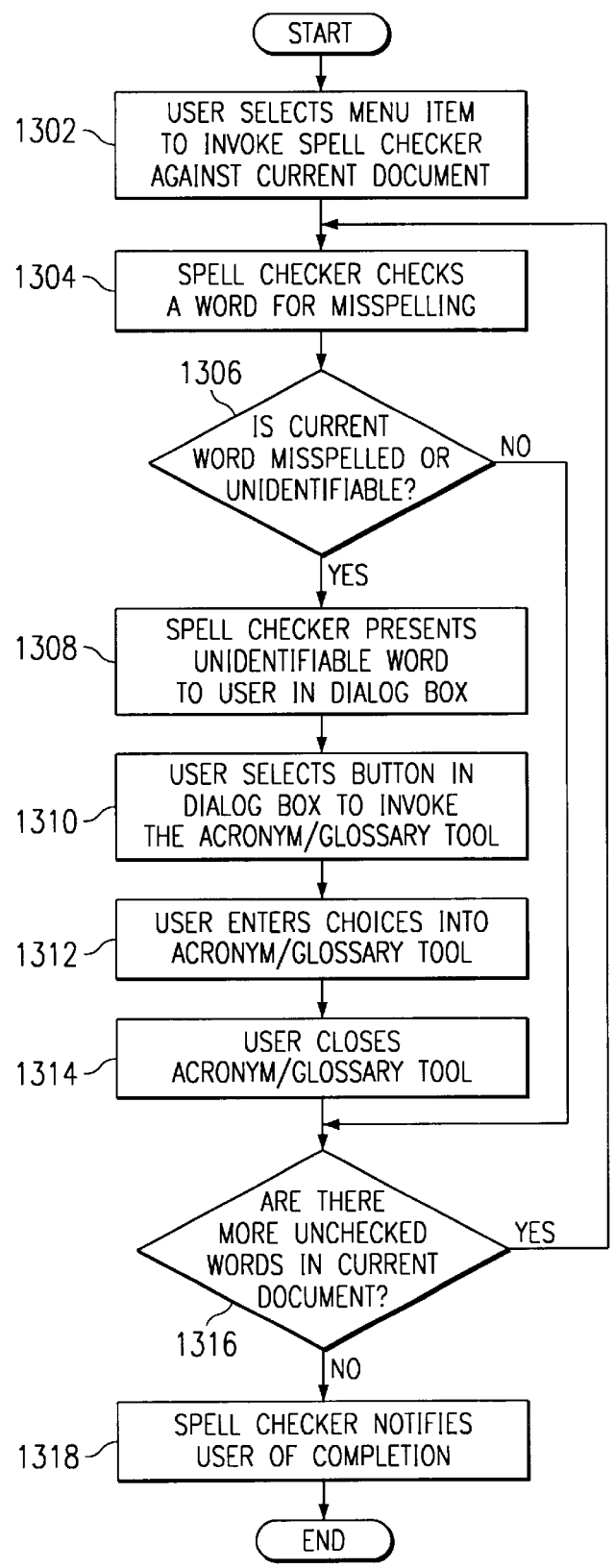
FIG. 13 is a flowchart depicting a manner in which a user may invoke and use an acronym/glossary tool within a data processing system.

With reference now to FIG. 13, a flow chart depicts a manner in which a user may invoke and use an acronym/glossary tool within a data processing system. The process begins when the user selects a menu to invoke a spell checker against a current document or datastream (step 1302). The spell checker begins execution and checks each word in a datastream or document for misspelling by comparing each word against one or more dictionary and/or glossary files (step 1304). A determination is then made as to whether the current word is misspelled or unidentifiable (step 1306). If so, then the spell checker presents the unidentifiable or misspelled word in a window or dialog box (step 1308).

At this point, the user may select a button in the dialog to invoke the acronym/glossary tool (step 1310). While the acronym/glossary tool is active, the user enters processing choices for new terms into the acronym/glossary tool (step 1312). The user then closes the acronym/glossary tool (step 1314), and the spell checker may then continue its processing. A determination is then made as to whether there are other unchecked words in the current document or datastream (step 1316). If so, then the process returns to step 1304 so that the spell checker may continue comparing words against the dictionary. If there are no more words to be checked, then the spell checker notifies the user of the completion of the scan of the current document or datastream (step 1318).

As the spell checker compares each word against a dictionary or glossary, the majority of words will most likely be correctly spelled. In that case, the process branches from step 1306 to step 1316 and continues to verify each word within the current document or datastream.

Figure 14:
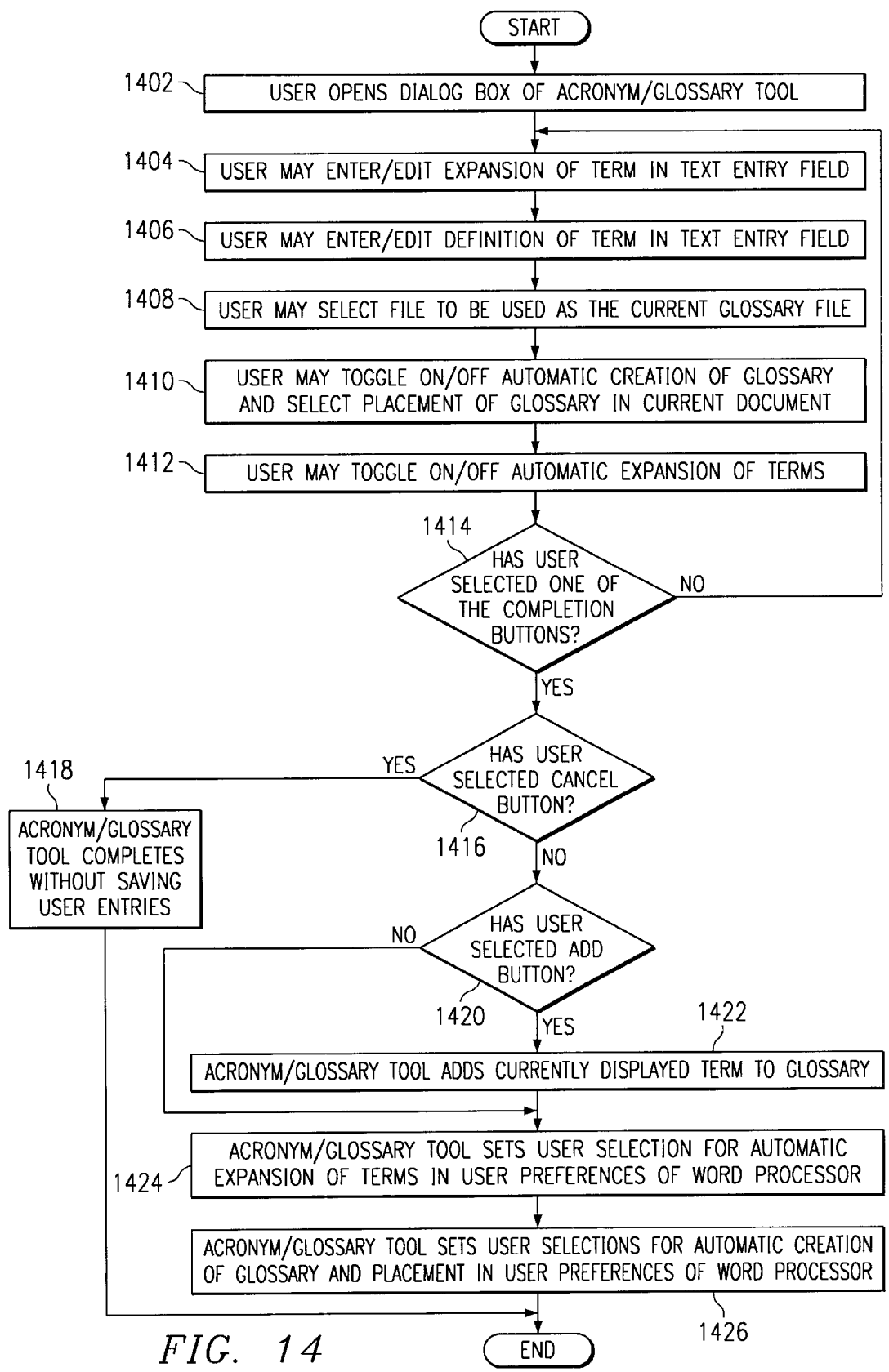
FIG. 14 is a flowchart depicting the processing provided by an acronym/glossary tool in response to user input and user selections within an acronym/glossary tool window.

With reference now to FIG. 14, a flowchart depicts the processing provided by an acronym/glossary tool in response to user input and user selections within an acronym/glossary tool window. The process begins when a user opens a dialog box for the acronym/glossary tool (step 1402). The user may invoke the acronym/glossary tool in conjunction with using a spell checker tool. Alternatively, the user may select a menu within a word processor that invokes an independently controllable acronym/glossary tool within the word processor application. As another example, the acronym/glossary tool may be configured as a plug-in within an Internet browser that continually scans downloaded documents and incoming datastreams from the Internet in order to detect acronyms or unidentifiable terms within the datastream and to process those acronyms or terms automatically. The acronyms or terms embedded within the incoming datastreams could be automatically expanded so that the user is provided with a more readable document when displayed for the user.

The acronym/glossary tool process continues by allowing the user to enter or edit an expansion of a term in a text entry field (step 1404). The user may enter or edit the definition of the term in a separate text entry field (step 1406). The user may also be provided with an option for selecting a file to be used as the current glossary file (step 1408). Multiple glossary files may be available to the user on a per document basis or per user basis, as a local glossary pertinent to the current data processing system, or as a global glossary file pertinent to multiple users on a network.

The user may also toggle on/off an option for the automatic creation of a glossary and may also select the placement of the glossary within the current document (step 1410). Although the inclusion of a glossary may be optional and included only when specifically specified by a user, once the user has chosen to include a glossary, then the user may select the location of the glossary within a document or datastream. The location of the placement of the glossary may include such options as endnote, footnote, and positions within a page, chapter, or section of the document or datastream or any other logical division within the document or datastream. As an alternative to controlling the location of the glossary as an endnote or footnote with a radio button control, as shown in FIG. 9, the acronym/glossary tool may contain a control, such as a pull-down menu that is linked to the current location of the cursor, that allows the user to more specifically place the location of the glossary. For example, the user may be able to specify the placement of the glossary immediately after an abstract at the beginning of a document.

The user may also toggle on/off an option for the automatic expansion of a term (step 1412). The automatic expansion may be a default that applies to the foremost occurrence of a term within a datastream. However, other options could be provided to a user so that the user may apply the automatic expansion feature to all occurrences of the term within the datastream. For example, the user may toggle the on/off feature individually for each special term. If the user understands certain terms or sets of terms within a document, the expansion of the terms may become an annoyance, and the user may desire the ability to permanently turn off the expansion of certain terms without affecting the ability of the acronym/glossary tool to expand other terms. In some cases, terms may be so well known that it would appear odd to expand the term. PC, CD, ROM, RAM, and DOS are a few examples for which an acronym expansion is generally not necessary. The choice of expansion options may optionally be stored in the dictionary or glossary so that the expansion option is applied to more than one document or datastream. In that case, the choice not to expand a well-known acronym such as PC or CD would be applied to all documents or datastreams until overridden on an individual document basis.

A determination is then made as to whether the user has selected one of the completion buttons within the dialog box (step 1414). In the example provided in FIG. 9, this would include ADD button 916, IGNORE button 914, and CANCEL button 912. If the user has not selected one of the completion buttons, then the process returns to step 1404 so that the user may continue entering input into the dialog box. If the user has selected a completion button, then a determination is made as to whether the user has selected the CANCEL button (step 1416). If so, then the acronym/glossary tool completes without saving any user entries or user-selected options within the dialog box (step 1418). In this case, the process then branches to its termination point.

If the user has not selected the CANCEL button, then a determination is made as to whether the user has selected the ADD button (step 1420). If so, then the acronym/glossary tool adds the currently displayed term to the current glossary that has been selected or previously selected by the user (step 1422). The process then continues to the next step. If the user has not selected the ADD button, then the user could have selected the IGNORE button. In this instance, the process then continues without adding the currently displayed term to the glossary.

The acronym/glossary tool then sets the user selection for automatic expansion of terms as one of the user preferences within the word processor (step 1424). The user may toggle the selection several different times during a word processing session without effecting previously inserted expansions in the datastream. The acronym/glossary tool then sets the user selection for the automatic creation of the glossary and its placement as a user preference within the word processor (step 1426). The user may toggle the selection for the automatic creation in placement of the glossary several times during a single session of the word processor or processor application without effecting the movement of a previously placed glossary within the document or datastream.

Alternatively, when the user selects to turn off the automatic creation and placement of the glossary, the acronym/glossary tool insures that no glossary appears within the current document or datastream. Various options for placing expansions and glossaries within the datastream other than those described may be provided to the user in order for the user to create a document that matches the user's desired level of readability.

Assuming that a user has chosen to place a glossary within a document or datastream, the terms that appear within the glossary may be automatically indexed. The user may view or search an index of terms and acronyms comprising all words in the datastream or only those words that appear in the glossary. The index may be placed at user specified locations. The glossary may have its own index or be combined with an overall index for the document or datastream. The location of the index may be specified by the user in a manner similar to the placement of the glossary described above.

Figure 15A:
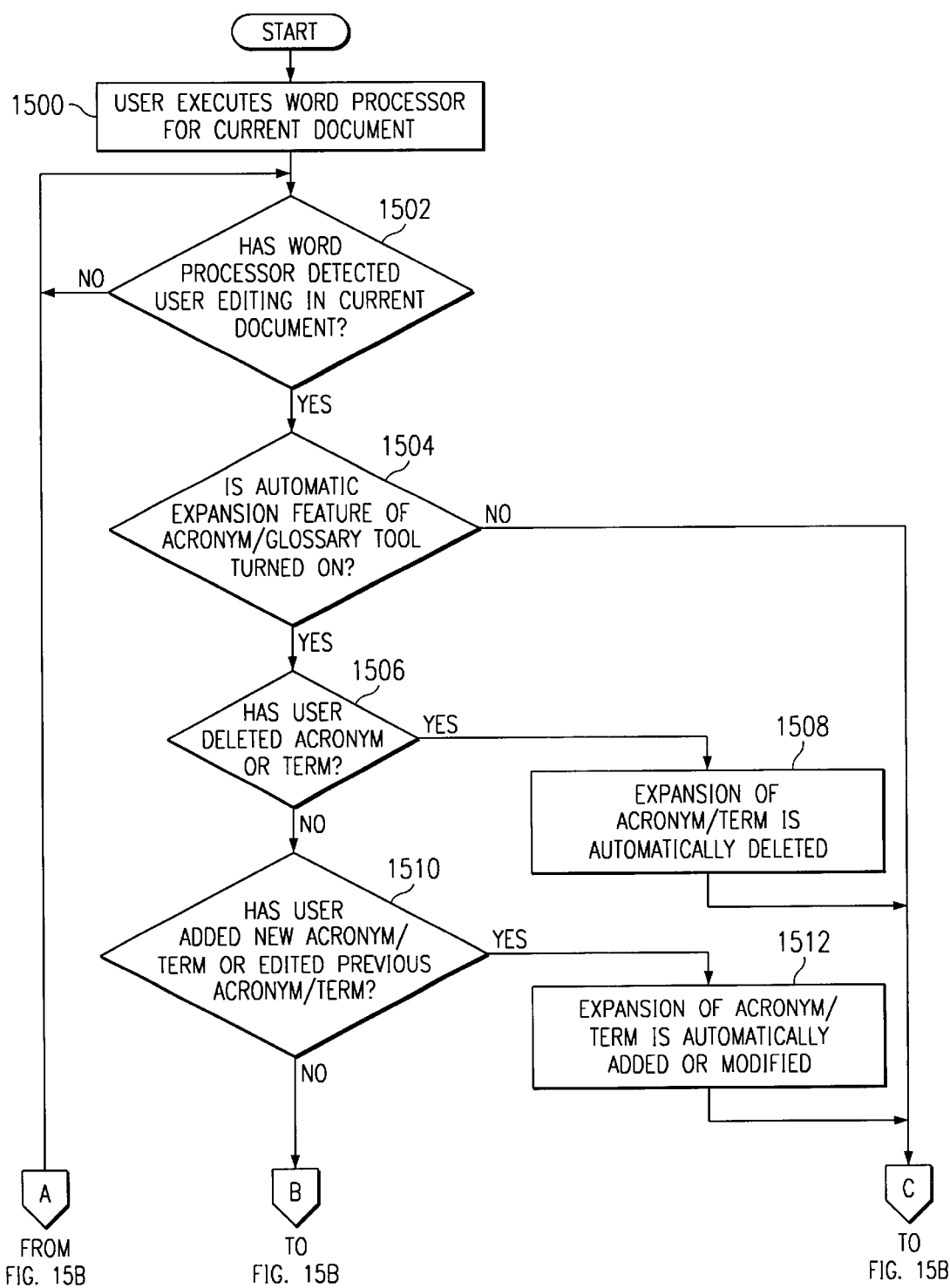
FIG. 15 is a flowchart depicting a process for modifying a datastream to include term expansion or glossaries in accordance with a preferred embodiment of the present invention.
Figure 15B:
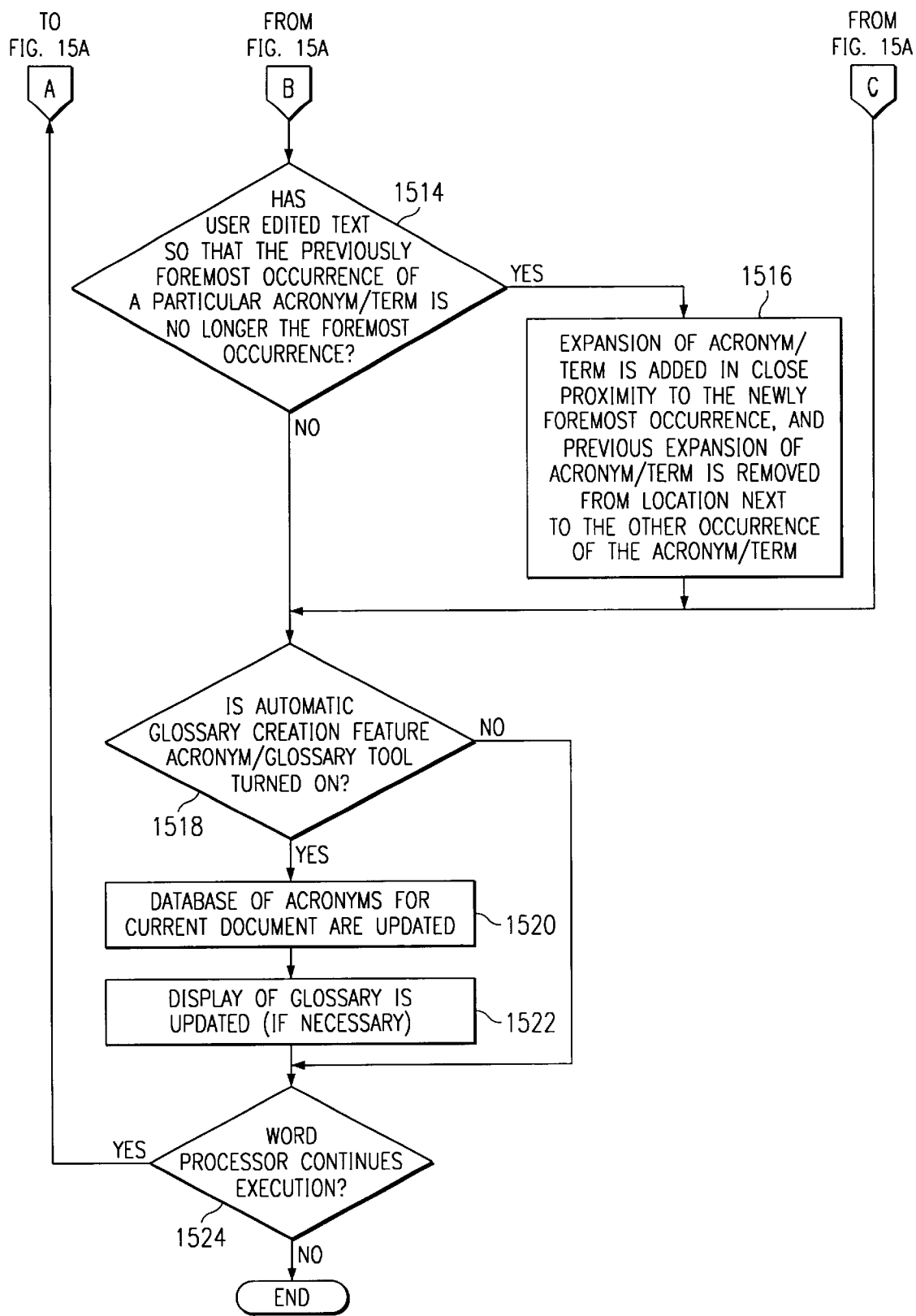

With reference now to FIG. 15, a flowchart depicts a process for modifying a datastream to include term expansion or glossaries in accordance with a user preference selected within an acronym/glossary tool. The process begins when a user executes a word processor for a current document (step 1500). The word processor determines whether a user has edited the current document or datastream (step 1502). If not, then the word processor performs other duties unrelated to new term or acronym processing. In this manner, the word processor is in a continually executing loop until terminated.

If the word processor detects that the user has edited the current document, then a determination is made as to whether the automatic expansion feature of the acronym/term has been selected by the user (step 1504). If not, then the process skips to step 1518.

If the user has selected the automatic expansion feature of the acronym/glossary tool, then a determination is made as to whether the user has deleted an acronym/term (step 1506). If not, then the process continues to step 1510. If so, then the expansion of the deleted acronym/term is also automatically deleted if necessary, i.e. if the expansion was also present in the datastream in close proximity to the acronym/term (step 1508). The process then branches to step 1518.

If the user has not deleted an acronym/term, then a determination is then made as to whether the user has added a new acronym/term or edited an acronym/term that was previously present in the datastream (step 1510). If not, then the process skips to step 1514. If so, then the expansion of the acronym/term is automatically added or modified as necessary (step 1512). The process then branches to step 1518.

If the user has not edited or added an acronym/term, then a determination is made as to whether the user has edited the text in a manner such that the previously foremost occurrence for a particular acronym/term is no longer the foremost occurrence of the acronym/term in the datastream (step 1514). If so, then the expansion of the acronym/term is inserted into the datastream in close proximity to the new location of the foremost occurrence of the acronym/term, and the previous expansion of the acronym/term is removed from the location in close proximity to the previously foremost occurrence of the acronym/term (step 1516).

In order to make this detection or determination, the word processor or acronym/glossary tool may be continually monitoring the text which the user edits. This may be done by: parsing the datastream into tokens; comparing the tokens against known spellings in dictionaries and/or glossaries; comparing the location of acronyms/terms within the datastream against a previous list of locations of acronyms/terms within the datastream; and then modifying the locations or expansions of acronyms/terms automatically occurring in the newly generated list of acronyms/terms. Parsing and scanning a datastream into tokens is a well-known technique in the art. However, many different and equivalent methods of tracking words within a datastream may be provided. This may include generating a list of acronyms/terms and their locations within a datastream upon receipt of or retrieval of the datastream. The list of acronyms/terms and locations may be updated upon each edit of the datastream.

A determination is then made as to whether the user has selected the options for automatically creating and placing a glossary in the datastream (step 1518). If so, then the database of acronyms/terms for the current document or specified user option is updated based upon any acronym/term appearing within the content that the user may have added during the most recent edit (step 1520). The display of the glossary is also updated, if necessary, according to user specified options (step 1522). If it is determined that the automatic glossary creation feature has been turned off by the user, then the process jumps to step 1524.

The process then continues with a determination as to whether the word processor should continue execution (step 1524). If the processor should continue execution, then the process loops back to step 1502 as part of the recurrent processing of the word processor. Otherwise, the process terminates.

Figure 16:
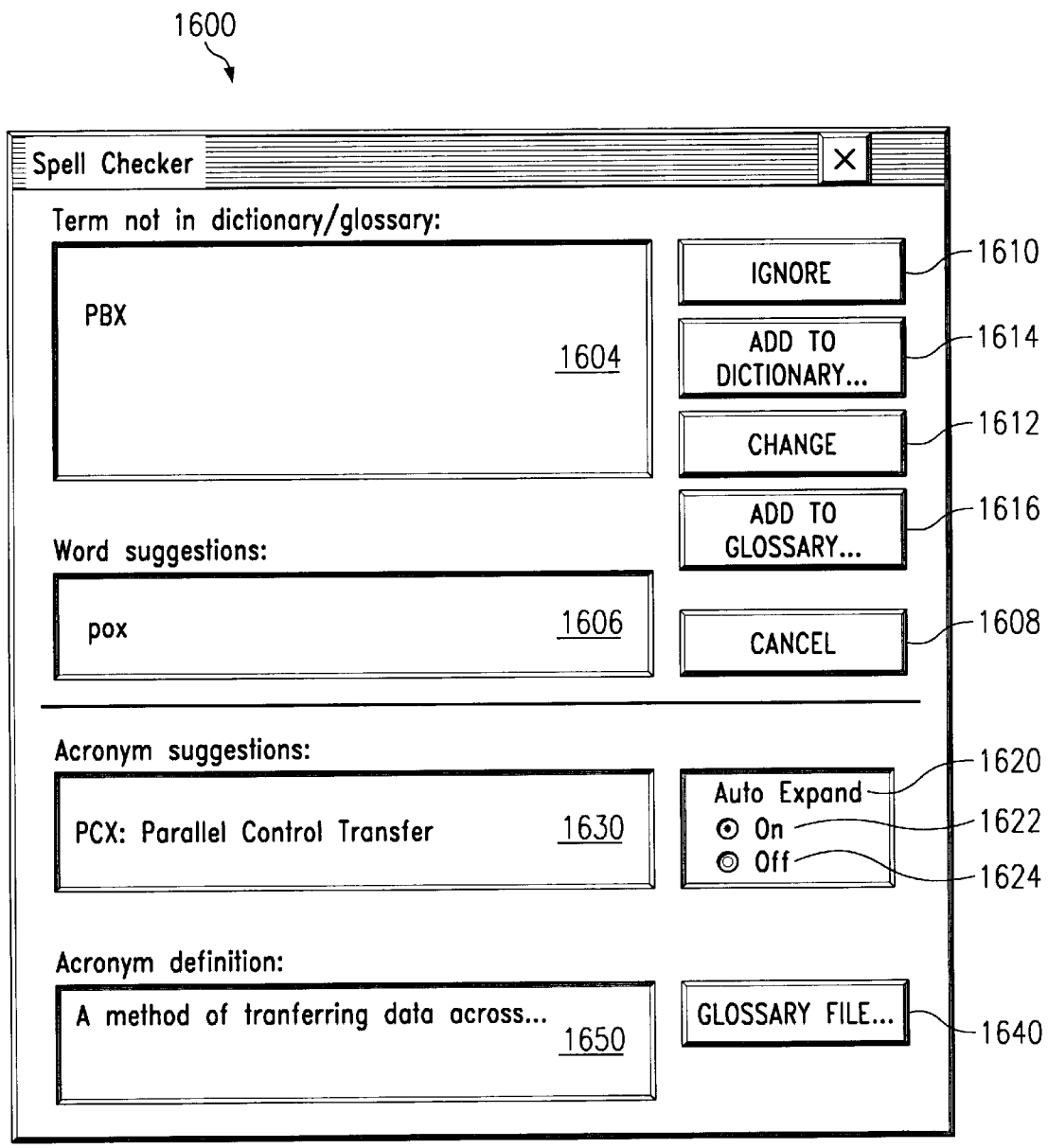
FIG. 16 is a pictorial representation depicting a dialog box for a tool that combines spell checking capabilities and glossary term processing capabilities.

With reference now to FIG. 16, a pictorial representation depicts a dialog box for a spell checking tool that may have been invoked in response to a user request. Window 1600 may be presented to a user in response to a user selection through a menu similar to that shown in FIG. 7. Window 1600 combines the functionality of a spell checker and an acronym/glossary tool. Hence, window 1600 is similar to window 800 shown in FIG. 8 and window 900 shown in FIG. 9.

At the point in time at which a dialog box similar to window 1600 appears, the spell checker tool has scanned the words present in a document window of a word processor in order to determine whether any of the words are misspelled. Words that have not been identified as correctly spelled words or as previously defined acronyms or special terms are presented to the user within window area 1604.

In this case, the word "PBX" has been located within the document window but has not been matched with any words in any of the dictionaries or with any acronyms or special terms in any of the glossaries. Properly spelled words are suggested to a user in window area 1606. In this example, the word "POX" has been suggested to the user as a replacement word for the unidentified word "PBX". The spell checker tool identifies potentially misspelled words and suggests to the user properly spelled words.

If the user believes that the word is properly spelled or is an undefined acronym or special term, the user may select IGNORE button 1610. Selection of the IGNORE button informs the spell checker that the currently unidentified word, acronym, or term should be ignored by the spell checker, and the spell checking function should continue scanning for misspelled words within the current document. If the user believes that the unidentified word is a correctly spelled word, then the user may select "ADD TO DICTIONARY" button 1614 that informs the spell checker to add the unidentified word to one of the dictionary files as a correctly spelled word. Subsequent comparisons between the current word and the modified dictionary will result in a positive identification of the word so that it is not flagged as a misspelled word. If the user agrees that the unidentified word is a misspelled word and believes that the unidentified word should be replaced with the word suggested by the spell checker, then the user may select CHANGE button 1612, which will replace the unidentified word with the suggested word.

If the user believes that the unidentified word is a correctly spelled acronym or special term, the user may select "ADD TO GLOSSARY" button 1616 that informs the spell checker to add the unidentified word to one of the glossary files as a correctly spelled acronym/term. The spell checker may then pop up another window in which the user may enter the expansion and definition of the new acronym/term. If the user desires to stop the spell checker, then the user may select CANCEL button 1608.

Acronym box 1630 presents a word that has previously been identified as an acronym and may have been retrieved from a glossary. In this case, the acronym box contains the acronym "PCX" which is the closest acronym that approximates the spelling of the currently unidentified word. The acronym box also contains the expansion of the suggested acronym. Definition box 1650 contains the definition for the acronym presented as acronym 1630.

"GLOSSARY FILE" button 1640 provides the user with control over the storage of the unidentified word into one of the glossary files.

Window 1600 also contains Auto Expand control 1620 for allowing the user to specify an option for the automatic expansion of the displayed acronym/term within the current document. Radio buttons 1622 and 1624 allow the user to toggle the feature on and off. If the user selects this feature, the acronym/glossary tool will insert an expansion of an acronym/term automatically into the current document in close proximity to the foremost occurrence of the acronym/term in the document.

The processing methods and tools of the present invention provides a user with a convenient manner for creating a document or datastream that is more readable. A glossary of acronyms or special terms is provided in a manner that provides the reader of the document with information necessary for comprehending the acronyms or terms in the context of the datastream. By embedding a glossary within the datastream, the user may refer to the glossary for definitions of acronyms or special terms when an expansion of an acronym or term does not provide the user with enough information for understanding any unfamiliar acronyms or special terms.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating a glossary of terms for a document, the method comprising the computer-implemented steps of:

in response to user input, receiving an indication that a term is a correctly spelled new term and receiving at least one definition of the new term;

automatically constructing a glossary of terms for the document comprising the new term and the at least one definition of the new term; and automatically placing the at least one definition from the glossary at an at least one user selectable location within a document.

2. A method for creating a glossary of terms, the method comprising the computer-implemented steps of:

automatically scanning a document;

automatically detecting unmatched terms in the document by searching a datastore of terms and/or acronyms for each word in the document;

in response to receiving user input that the unmatched terms are new terms that are correctly spelled, receiving definitions of the new terms, wherein the definitions include a term expansion and a term definition; and automatically creating a glossary for the document comprising the new terms and the definitions of the new terms.

3. A method for processing a datastream, the method comprising the computer-implemented steps of:

automatically scanning a datastream;

automatically detecting, in the datastream, a term that does not match an indexed term or word in a dictionary or glossary;

in response to user input, identifying the unmatched term as a correctly spelled new term;

in response to user input, receiving at least one definition of the new term;

automatically storing the new term and the at least one definition of the new term as an entry in a glossary; and automatically placing the at least one definition from the glossary at an at least one user selectable location within a datastream.

4. The method of claim 3 wherein the step of automatically scanning a datastream is responsive to a spell checking operation.

5. The method of claim 3 further comprising:

constructing an index of new terms for the datastream; and storing the index of new terms as a portion of the datastream.

6. The method of claim 3 further comprising:

in response to user input, providing a term expansion and a term definition of the new term; and associatively storing the new term, the term expansion, and the term definition of the new term in the glossary.

7. The method of claim 3 wherein the glossary is stored as a portion of the datastream.

8. The method of claim 3 wherein the glossary is stored as a file associated with the datastream.

9. The method of claim 3 wherein the glossary is stored in a user selectable file.

10. The method of claim 3 wherein the new term is at least one of an acronym, a technical term, an industry specific term, and an unidentifiable word or phase.

11. The method of claim 3 wherein the datastream is a document.

12. The method of claim 3 wherein the step of automatically detecting an unmatched term in a datastream is performed by comparing words in the datastream to words stored in a set of dictionaries and/or glossaries.

13. The method of claim 3 wherein the unmatched term is automatically detected in response to spell checking the datastream and subsequently flagging the unmatched term as a misspelled word.

14. The method of claim 3 wherein the glossary is placed at a user selectable location within the datastream.

15. An apparatus for processing a datastream, the apparatus comprising:

scanning means for automatically scanning a datastream;

detecting means for automatically detecting, in the datastream, a term that does not match an indexed term or word in a dictionary or glossary;

identifying means for identifying, in response to user input, the unmatched term as a correctly spelled new term;

receiving means for receiving, in response to user input, at least one definition of the new term;

storing means for automatically storing the new term and the at least one definition of the new term as an entry in a glossary; and placing means for automatically placing the at least one definition from the glossary at an at least one user selectable location within a datastream.

16. The apparatus of claim 15 wherein scanning means for automatically scanning a datastream is responsive to a spell checking operation.

17. The apparatus of claim 15 further comprising:

constructing means for constructing an index of new terms for the datastream; and storing means for storing the index of new terms as a portion of the datastream.

18. The apparatus of claim 15 further comprising:

providing means for providing, in response to user input, a term expansion and a term definition of the new term; and storing means for associatively storing the new term, the term expansion, and the term definition of the new term in the glossary.

19. The apparatus of claim 15 wherein the glossary is stored as a portion of the datastream.

20. The apparatus of claim 15 wherein the glossary is stored as a file associated with the datastream.

21. The apparatus of claim 15 wherein the glossary is stored in a user selectable file.

22. The apparatus of claim 15 wherein the new term is at least one of an acronym, a technical term, an industry specific term, and an unidentifiable word or phase.

23. The apparatus of claim 15 wherein the datastream is a document.

24. The apparatus of claim 15 wherein the detecting means for automatically detecting an unmatched term in a datastream compares words in the datastream to words stored in a set of dictionaries and/or glossaries.

25. The apparatus of claim 15 wherein the detecting means for automatically detecting an unmatched term operates in response to spell checking the datastream that subsequently flags the unmatched term as a misspelled word.

26. The apparatus of claim 15 wherein the glossary is placed at a user selectable location within the datastream.

27. A computer program product in a computer-readable medium for use in a data processing system for creating a glossary of terms for a document, the computer program product comprising:

first instructions for receiving, in response to user input, an indication that a term is a correctly spelled new term and receiving at least one definition of the new term;

second instructions for automatically constructing a glossary of terms for the document comprising the new term and the at least one definition of the new term; and third instructions for automatically placing the at least one definition from the glossary at an at least one user selectable location within a document.

28. A computer program product in a computer-readable medium for processing a datastream in a data processing system, the computer program product comprising:

first instructions for automatically scanning a datastream;

second instructions for automatically detecting, in the datastream, a term that does not match an indexed term or word in a dictionary or glossary;

third instructions for identifying, in response to user input, the unmatched term as a correctly spelled new term;

fourth instructions for receiving, in response to user input, at least one definition of the new term;

fifth instructions for automatically storing the new term and the at least one definition of the new term as an entry in a glossary; and sixth instructions for automatically placing the at least one definition from the glossary at an at least one user selectable location within a datastream.

29. The computer program product of claim 28 wherein instructions for scanning a datastream are responsive to a spell checking operation.

30. The computer program product of claim 28 wherein the unmatched term is automatically detected in response to spell checking the datastream and subsequently flagging the unmatched term as a misspelled word.

* * * * *